United States Patent
Johansson et al.

(10) Patent No.: US 8,621,209 B1
(45) Date of Patent: *Dec. 31, 2013

(54) CONFIDENCE-BASED AUTHENTICATION (75) Inventors: Jesper M. Johansson, Redmond, WA (US); Darren E. Canavor, Redmond, WA (US); Daniel W. Hitchcock, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/277,026

(22) Filed: Oct. 19, 2011

(51) Int. Cl.
*H04L 29/06* (2006.01)
*H04L 9/32* (2006.01)
*G06F 7/04* (2006.01)

(52) U.S. Cl.
USPC .......... 713/166; 713/155; 713/165; 713/170; 726/2; 726/27

(58) Field of Classification Search
USPC ............. 726/7, 2, 27; 713/155, 165, 166, 170
See application file for complete search history.

(56) References Cited

U.S. PATENT DOCUMENTS

| | | | |
|---|---|---|---|
| 2005/0216768 A1* | 9/2005 | Eppert | 713/201 |
| 2009/0276839 A1* | 11/2009 | Peneder | 726/8 |
| 2012/0072975 A1* | 3/2012 | Labrador et al. | 726/6 |

OTHER PUBLICATIONS

U.S. Appl. No. 13/194,287 entitled "Managing Security Credentials," which was filed on Jul. 29, 2011.

* cited by examiner

*Primary Examiner* — Mohammad W Reza
(74) *Attorney, Agent, or Firm* — Thomas | Horstemeyer, LLP (57) ABSTRACT

Disclosed are various embodiments that perform confidence-based authentication of a user. An identification of a user account is obtained from a user, and a minimum confidence threshold is determined. Multiple authentication questions are presented to the user, where the authentication questions are determined based at least in part on stored transaction information associated with the user account. Answers are obtained from the user to a subset of the questions, with each answer having a corresponding authentication point value. A confidence score is generated for the user, where the confidence score is increased by the respective authentication point values of the correct answers. Access by the user to a resource associated with the user account is authorized in response to determining that the confidence score meets the minimum confidence threshold.

21 Claims, 6 Drawing Sheets

CONFIDENCE-BASED AUTHENTICATION

BACKGROUND

Verifying the identity of a person or group of people, referred to as authentication, has many uses in the context of computing. People often have multiple user accounts—accounts in the operating systems of their computing devices, accounts with social networking sites, accounts with online retailers, and so on—that employ some type of authentication before access to the account is granted. In many cases, these accounts are configured to authenticate a user depending on whether the user provides a correct username and password combination. If the user provides a correct username and password, access to account resources is granted. If the user does not provide a correct username and password, access to account resources is denied.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to confidence-based authentication systems. Authentication typically involves a user presenting a username along with a password, a key, a personal identification number, and/or another form of security credential. Evaluation of the security credential produces a binary result: either the user is authenticated, or the user is not authenticated. Consequently, malicious users may gain access to the account if they have access to the security credential. Conversely, legitimate users may lose access to the account if they forget the security credential.

Various embodiments of the present disclosure implement a confidence-based authentication system where a user may be presented with multiple authentication questions that may have varying point values. Point values associated with correctly answered questions are used to generate a confidence score. When the confidence score meets a minimum confidence threshold, the user is authenticated and access may be granted to secured resources. In the following discussion, a general description of the system and its components is provided, followed by a discussion of the operation of the same.

Figure 1:
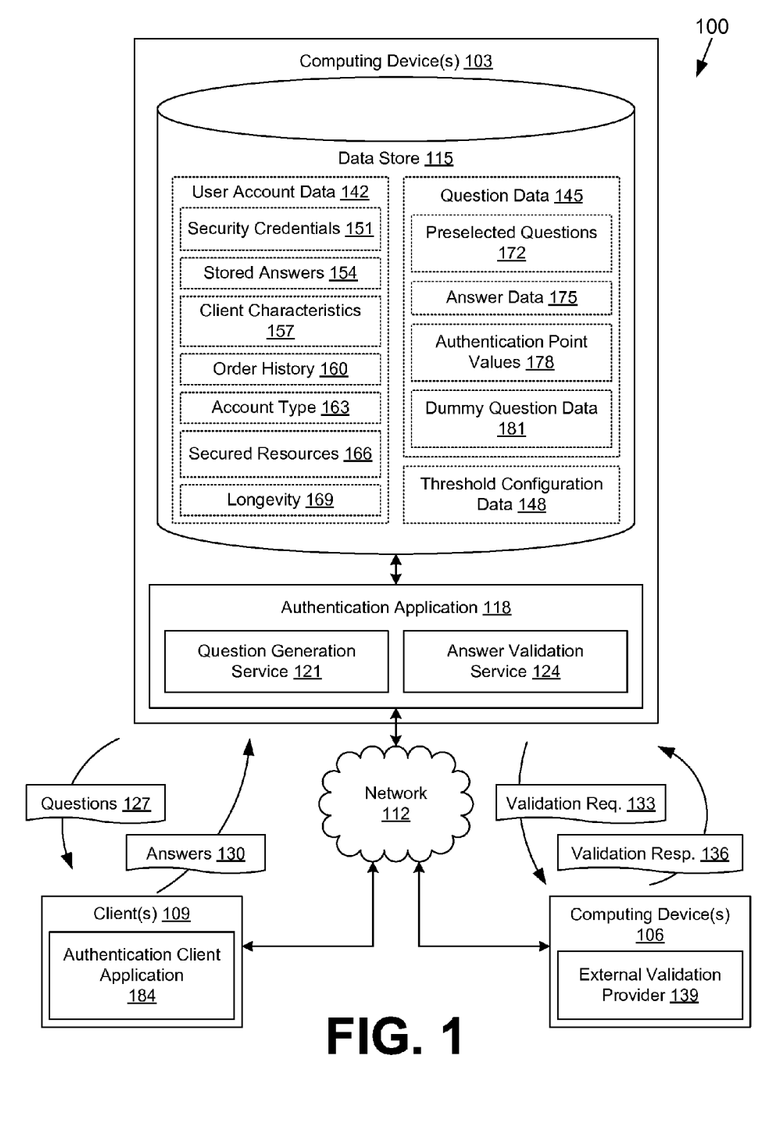
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include an authentication application 118 and other applications, services, processes, systems, engines, or functionality not discussed in detail herein. The authentication application 118 is executed to authenticate users in order to authorize access to secured resources. To this end, the authentication application 118 may include a question generation service 121, an answer validation service 124, and/or other components. The question generation service 121 is configured to generate a set of authentication questions 127, which are presented to the user at the client 109. The authentication questions 127 may correspond, for example, to knowledge-based questions and/or prompts for security credentials.

Answers 130 to a subset of the questions 127 are obtained from the client 109, and then evaluated by the answer validation service 124. The answer validation service 124 is configured to determine whether the answer 130 to a question 127 is correct. In some cases, the answer validation service 124 may submit validation requests 133 to, and receive validation responses 136 from, an external validation provider 139 executed in the computing device 106. Depending on the correct or incorrect answers 130 that are provided, a confidence score is generated by the authentication application 118. If the confidence score meets a minimum confidence threshold, access to one or more secured resources is authorized for the user at the client 109. If the confidence score does not meet the minimum threshold, additional questions 127 may be generated and presented to the user. If the confidence score falls beneath a negative confidence threshold, access to any secured resource of the account may be denied.

The data stored in the data store 115 includes, for example, user account data 142, question data 145, threshold configuration data 148, and potentially other data. The user account data 142 includes data associated with various user accounts for which the authentication application 118 performs authentication. The user account data 142 may include, for example, security credentials 151, stored answers 154, client characteristics 157, order history 160, an account type 163, secured resources 166, information about longevity 169, and/or other data. The security credentials 151 may include passwords, hashes of passwords, public-key encryption data, data to validate one-time passwords, data to validate personal identification number (PIN) values, biometric identity data, and/or other data. The stored answers 154 may include stored valid answers to preconfigured authorization questions 127, or their hash values, which are stored as a result of forced or voluntary knowledge-based question enrollment.

The client characteristics 157 may define various characteristics associated with the clients 109 employed by users of the respective account. Such client characteristics 157 may include cookie information, client 109 locations (e.g., ZIP codes, global positioning system (GPS) location coordinates, geolocation results, etc.), internet protocol (IP) addresses, and/or other characteristics that may be associated with use of the clients 109. The order history 160 may correspond to a purchase or transaction history for products, services, downloads, and/or other items associated with the user account. For example, the user account may correspond to an account with a merchant or electronic marketplace for which a purchase history may be available. The order history 160 may include transaction data associated with purchase transactions, account enrollment transactions, etc.

An account may be associated with one or more account types 163 from a selection of multiple account types 163. For example, a user account may be for a customer, a merchant, a developer, a payments clerk, a system administrator, and so on. Different types of accounts may be associated with different privileges and may be subject to varying levels of security. The secured resources 166 may correspond to various resources to which the user may gain access through authentication.

As non-limiting examples, the secured resources 166 may include a directory or file system in a networked storage system, an email account, a password change or reset utility, an order management portal for merchants, an order management portal for customers, and/or other resources. Moreover, in various embodiments, the secured resources 166 may correspond to tangible resources for which physical access is controlled by the authentication application 118. Non-limiting examples of such tangible resources may include building doors, locks, physical safes, and so on.

The information about longevity 169 may describe how long the corresponding user account has been active, creation date for user account, and/or other information. Values may describe the longevity 169 for various configuration settings in the user account such as billing addresses, telephone numbers, etc. The user account data 142 may include other information such as social security numbers or portions thereof, payment instrument information, demographic information, mailing addresses, physical addresses, etc.

The question data 145 includes data relevant to the generation of questions 127 by the question generation service 121 and the validation of answers 130 by the answer validation service 124. The question data 145 may include, for example, preselected questions 172, answer data 175, authentication point values 178, dummy question data 181, and/or other data. The preselected questions 172 may correspond to questions that are preselected by the user and/or the authentication application 118 through, for example, forced or voluntary enrollment. The preselected questions 172 may have corresponding stored answers 154 associated with the user account data 142 of the user.

The answer data 175 may include data used to validate answers 130 by the answer validation service 124. The authentication point values 178 are assigned to each question 127 generated by the question generation service 121. The authentication point values 178 are employed to weight the responses to the questions 127 in generating confidence scores. The dummy question data 181 is used to create dummy questions 127 that are designed to elicit an incorrect response from invalid users. For example, a dummy question 127 may include four multiple choice answers including a "none of the above" choice, where "none of the above" is the correct answer.

The threshold configuration data 148 specifies the minimum confidence thresholds for confidence scores which are employed in various situations before a user is authenticated. For example, the minimum confidence threshold may differ based at least in part on the account type 163, the secured resources 166 to be accessed, the longevity 169 of the account, and/or other factors. Additionally, the threshold configuration data 148 may specify negative confidence thresholds and/or inverse confidence thresholds that are used to determine a confidence that the user is not associated with the account.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data may be stored in a data store that is accessible to the computing device 106. The components executed on the computing device 106, for example, include an external validation provider 139 and other applications, services, processes, systems, engines, or functionality not discussed in detail herein. The external validation provider 139 is executed to validate various information as requested by the answer validation service 124. To this end, the external validation provider 139 obtains validation requests 133 from the answer validation service 124 over the network 112 and generates validation responses 136 which are returned to the answer validation service 124 over the network 112. In one non-limiting example, the external validation provider 139 may validate a payment instrument such as a credit card according to a credit card number, billing address, verification code, etc. In another non-limiting example, the external validation provider 139 may validate a tax identifier.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, kiosks, or other devices with like capability. The client 109 may include a display such as, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as an authentication client application 184 and/or other applications. The authentication client application 184 is configured to present questions 127 to the user at the client 109 and to obtain answers from the user. In one example, the authentication client application 184 may correspond to a browser application that obtains network page data from the authentication application 118 or another network page server. The authentication client application 184 may then render a user interface for obtaining answers to the questions 127. In another example, the authentication client application 184 may correspond to a customer service application in use by a customer service agent who is in communication with the user by way of a telephone. The customer service agent may then present the questions 127 and obtain the answers 130 and then populate a user interface. The client 109 may be configured to execute applications beyond the authentication client application 184 such as, for example, mobile applications, browser applications, email applications, instant message applications, and/or other applications.

Next, a general description of the operation of the various components of the networked environment 100 is provided. To begin, a user initiates an authentication process through the authentication client application 184. For example, the user may be seeking to gain access to a user account of an electronic commerce system. Alternatively, the user may be attempting to open a secured physical door associated with a user account. Although the present disclosure discusses a user attempting to gain access, the user may correspond to a group of users. Indeed, some systems may require the presence of multiple users to authenticate access to an account, where each of the users provides some security credential 151. Many different examples may be employed relating to identifying a person or group of people and are applicable to the disclosure herein.

The authentication client application 184 may present a user interface to the user, such as a rendered network page, a mobile application, etc. Alternatively, a person may interact with a customer service agent or other intermediary by telephone, email, or other form of communication, and the agent may have access to the user interface on behalf of the user. The user provides some indication of the account to which access is desired. This indication may correspond to a name, username, identifying number, etc. In one embodiment, the indication may use a biometric form of identification.

The question generation service 121 of the authentication application 118 then determines a set of authentication questions 127 that will be presented to the user by way of the user interface, and possibly also through an intermediary such as a customer service agent. The set of questions 127 may be selected based at least in part on the preselected questions 172, the account type 163, the secured resources 166, factors relating to longevity 169, client characteristics 157, and so on. The questions 127 may include dummy questions in some scenarios. As a non-limiting example, the question generation service 121 may generate ten questions to be presented to the user.

The authentication application 118 then configures a user interface to present a form embodying the questions 127, which is sent to the client 109 over the network 112 for rendering by the authentication client application 184. The form may include short-answer questions, multiple choice questions, binary answer questions, and so on. The form may employ any number of user interface components such as selectable links, buttons, checkboxes, radio buttons, sliders, drop-down boxes, etc. to elicit user input.

The user may then choose to answer any number of the questions 127. The user may choose to answer all, some, one, or none of the questions 127. In other words, the user answers a subset of the questions 127. The answers 130 to the subset of the questions 127 are input to the form and sent from the authentication client application 184 to the authentication application 118 by way of the network 112.

The answer validation service 124 of the authentication application 118 then validates the answers 130 to the subset of the questions 127. The answer validation service 124 may compare the answers 130 to stored answers 154 in the case of preselected questions 172. The answer validation service 124 may also refer to some other stored answer data 175 and/or other data associated with the user account data 142 to determine whether an answer 130 is correct. In some situations, the answer validation service 124 may validate an answer 130 with an external validation provider 139 by way of the network 112.

The authentication application 118 determines authentication point values 178 associated with each answer 130. For example, each correct answer 130 might be worth 10 points. Different questions 127 may be associated with different weights related to confidence and thus different point values. Thus, an answer 130 to one relatively easy question 127 might be worth 5 points, while an answer 130 to a relatively hard question 127 might be worth 20 points. Some questions 127 might have multiple correct answers 130 or answers 130 that are partially correct. Therefore, different correct, or partially correct, answers 130 to the same question 127 might earn different point values for the user. The point values may be determined based at least in part on the preselected questions 172, the account type 163, the secured resources 166, factors relating to longevity 169, client characteristics 157, and on other data.

Non-limiting examples of questions 127 may include a prompt for a security credential 151 such as a password, one-time password, key, etc.; preselected questions 172 such as city of birth, high school mascot, name of favorite pet, etc.; dynamically generated questions 127 based at least in part on order history 160, demographic data, addresses, contact information, payment instruments, etc.; dummy questions 127; and so on. Where an order history 160 is available, the question generation service 121 might inquire as to a total price for a recent order, when an order for a particular item was placed, etc. If a location determined for the client 109 indicates that the client 109 may be in another country or otherwise far away from the usage patterns of the user account, the questions 127 may include culturally relevant questions 127 that may be easy for the legitimate user to answer but difficult for a malicious user to answer. If the user account is associated with a past due balance, a question 127 may elicit a payment instrument capable of external validation which may be used to pay the past due balance.

Point values may depend at least in part on recency of the data associated with the question 127 (e.g., older data might be more easily accessible by unauthorized users), longevity 169 of the data associated with the question 127 (e.g., a one-time password sent to a phone number that has been associated with the account for several years might be heavily weighted), difficulty of unauthorized access of the data (e.g., last four digits of a credit card are easily found on discarded credit card slips so such a question 127 might not be heavily weighted), and other factors.

The point values are then used to compute a confidence score for the user indicating a degree of confidence as to whether the user is a legitimate user associated with the indicated account. As an example, the earned points may be added to an initial confidence score of zero, where a higher score indicates a higher degree of confidence. As another example, the earned points may be subtracted from an initial confidence score of 100, where a lower score indicates a higher degree of confidence.

The confidence score is then compared to a minimum confidence threshold. The minimum confidence threshold determines whether the user is authenticated for access. For example, with an initial confidence score of 0, the minimum confidence threshold may be 100. Alternatively, with an initial confidence score of 100, the minimum confidence threshold may be 0. The minimum confidence threshold may vary based at least in part on several factors. Alternatively, the thresholds may remain constant while the point values are adjusted based at least in part on the various factors.

The minimum confidence threshold may vary according to the account type 163 associated with the user account. For example, a system administrator account may require a much higher minimum confidence threshold than an ordinary user account. As a non-limiting example, a reduced minimum confidence threshold may be employed for an account type 163 corresponding to the account of a child for which purchases are limited to $200 in comparison to a minimum confidence threshold employed for another account type 163 corresponding to an account with no purchase limit.

The minimum confidence threshold may vary based according to stored client characteristics 157 as compared to current characteristics of the client 109. To illustrate, the client 109 may be compared with devices used by the user account in the past. It may be determined whether the client 109 presents a certain stored cookie value or is located at a certain internet protocol (IP) address. The location of the client 109 (determined through global positioning system (GPS) coordinates, geolocation, entered location data, etc.) may be compared with stored locations of the client 109.

The minimum confidence threshold may vary according to longevity 169 of the account or the types of secured resources 166 to which access is desired by the user. As a non-limiting example, a reduced minimum confidence threshold may be employed for a secured resource 166 corresponding to the capability of accessing previously purchased music files in comparison to a minimum confidence threshold employed for another secured resource 166 corresponding to the capability of purchasing additional music files.

If the confidence score meets the minimum confidence threshold, the user may be authorized access to secured resources 166 associated with the user account. In some embodiments, different secured resources 166 may be associated with different minimum confidence thresholds such that a user may access one type of secured resource 166 with one confidence score and additional secured resources 166 with an increased confidence score. If the minimum confidence threshold is not met, the user may be presented with additional questions 127 in some embodiments. Further, a user who is already authenticated with a lower confidence score to access one type of secured resource 166 may be forced to answer more questions 127 to attempt to achieve a higher confidence score in order to gain access to a different type of secured resource 166. There may be a maximum number of questions 127 which may be presented or some other determinant of when to stop presenting questions 127 to the user.

A negative confidence threshold or an inverse confidence threshold may be employed. Such thresholds indicate a confidence that the user is not who he or she is claiming to be. With a negative confidence threshold, point values for incorrect answers may be subtracted from the confidence score or otherwise applied to decrease the confidence score. To illustrate, if an initial confidence score is 50, and a user answers two questions 127 incorrectly, the point values for those questions (e.g., 5 and 10) may be subtracted from 50 to yield a confidence score of 35. If the negative confidence threshold is 40, the authentication application 118 has a sufficient confidence that the user is not the correct user.

It is noted that point values for incorrect answers 130 need not be the same as point values for correct answers 130. In some cases, incorrect answers 130 may be associated with no points. Further, questions 127 that are not answered at all may be associated with a point value or no points. Where dummy questions are presented, an incorrect answer to a dummy question may be relatively costly in terms of decreasing the confidence score in some embodiments.

In addition, an inverse confidence score may be generated separately from the confidence score. Incorrect answers 130 and/or an absence of answers 130 may result in an increase to the inverse confidence score. The inverse confidence score may be compared with an inverse confidence threshold. The negative confidence threshold or the inverse confidence threshold may be determined based at least in part on the various factors used to determine the minimum confidence threshold. If the user reaches the negative confidence threshold or the inverse confidence threshold, the authentication application 118 may prevent the user from answering further questions 127 (temporarily or indefinitely) and thereby deny the user access to any of the secured resources 166 associated with the user account.

In one embodiment, the order of the questions 127 that are presented to the user may depend upon whether the user answers a previous question 127 correctly. For example, questions 127 that are presented may be sequenced so as to be gradually harder to answer until the minimum confidence threshold is reached. In various embodiments, point values may be shown to the user or may be hidden from the user.

Figure 2:
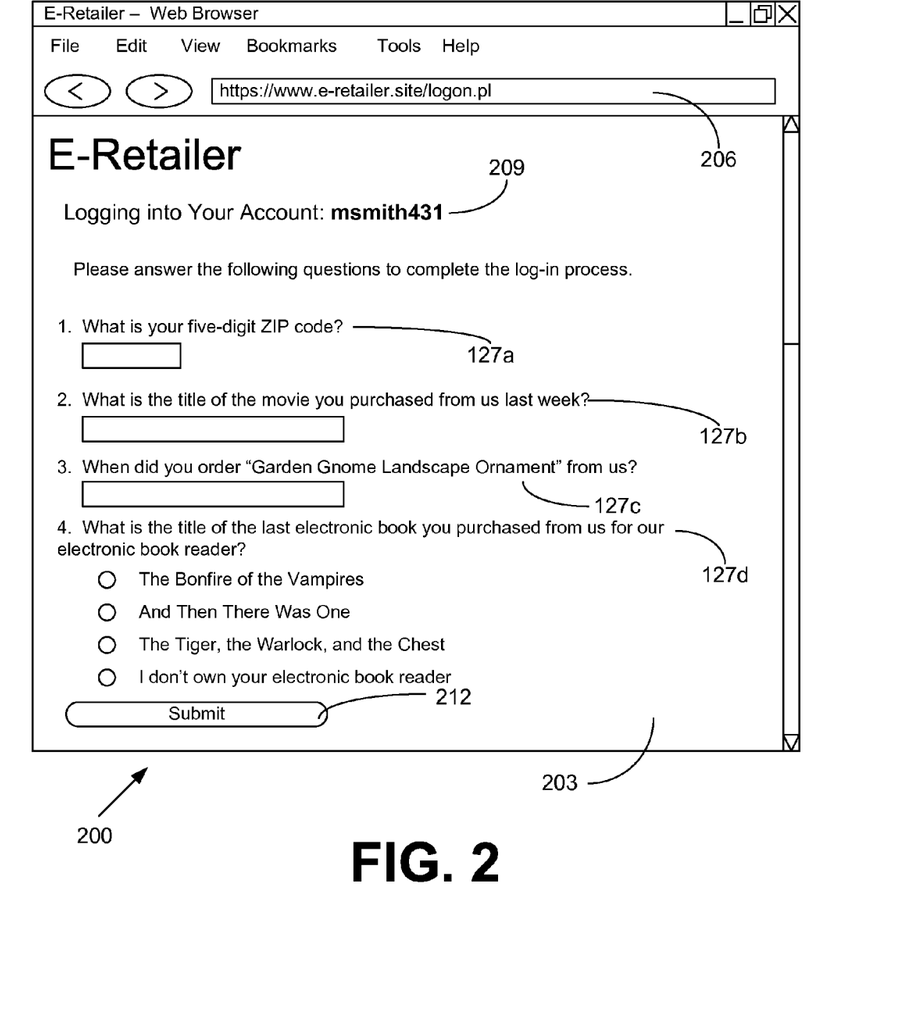
FIG. 2 is a drawing of an example of a user interface rendered by a client in the networked environment of FIG. 1 according to various embodiments of the present disclosure.

Continuing on to FIG. 2, shown is one example of a user interface 200 rendered by an authentication client application 184 (FIG. 1) executed in a client 109 (FIG. 1) in the networked environment 100 (FIG. 1). The user interface 200 depicts a rendered network page 203 that was generated at least in part by the authentication application 118 (FIG. 1). The rendered network page 203 facilitates answering various questions 127a, 127b, 127c, and 127d to authenticate with the authentication application 118.

The user interface 200 includes an address bar 206 which indicates that the connection between the client 109 and the computing device 103 (FIG. 1) over the network 112 (FIG. 1) is encrypted (e.g., by secure sockets layer (SSL), hypertext transfer protocol secure (HTTPS), transport layer security (TLS), or other forms of security). The rendered network page 203 includes an indication 209 of the user account for which the user is attempting to authenticate. In this example, the user account is associated with a username "msmith431."

The first question 127a that is presented asks, "What is your five-digit ZIP code?" This question 127a may, for example, correspond to a question generated from data collected during the process of account enrollment. Because this question 127a is relatively common and because the answer 130 (FIG. 1) may be relatively easy to obtain with research, the answer 130 may be given a relatively low point value.

The second question 127b that is presented asks, "What is the title of the movie you purchased from us last week?" Such a question 127b implicates data from the order history 160 (FIG. 1) of the user account. This data may be difficult to obtain as it is not likely to be shared among entities unassociated with the electronic commerce system. Thus, the answer 130 to the question 127b may be given a relatively high point value.

The third question 127c that is presented asks, "When did you order 'Garden Gnome Landscape Ornament' from us?" Such a question 127c also implicates data from the order history 160 of the user account. Likewise, data may be difficult to obtain as it is not likely to be shared among entities unassociated with the electronic commerce system. Thus, the answer 130 to the question 127c may be given a relatively high point value. Additionally, such a purchase may have been made several years ago, and the longevity 169 (FIG. 1) may implicate a greater or lesser point value depending on the situation. The user may be given partial credit depending upon what answer 130 is provided (e.g., year vs. month and year vs. exact date).

The fourth question 127d asks, "What is the title of the last electronic book you purchased from us for your electronic book reader that you purchased from us?" This question 127d may correspond to a dummy question. The user account data 142 may indicate that the user has not purchased an electronic book reader from the merchant. Therefore, because of the phrasing of the question, an authorized user may be tempted to select one of the electronic books listed as the answer 130, which may then be an important flag to the authentication application 118 that the user is not who he or she claims to be.

The rendered network page 203 may include a submit button 212 to submit the answers 130 to the authentication application 118. In some embodiments, the answers 130 may be submitted automatically after being entered or when the user moves on to the next question 127. The authentication application 118 may dynamically control which questions 127 are presented in the user interface 200 based at least in part on previous answers 130. Although FIG. 2 depicts multiple questions 127 being presented in the same user interface 200, in other embodiments, multiple questions 127 may be presented one at a time to be answered or skipped one at a time through a series of different rendered network pages 203 or screens.

Figure 3A:
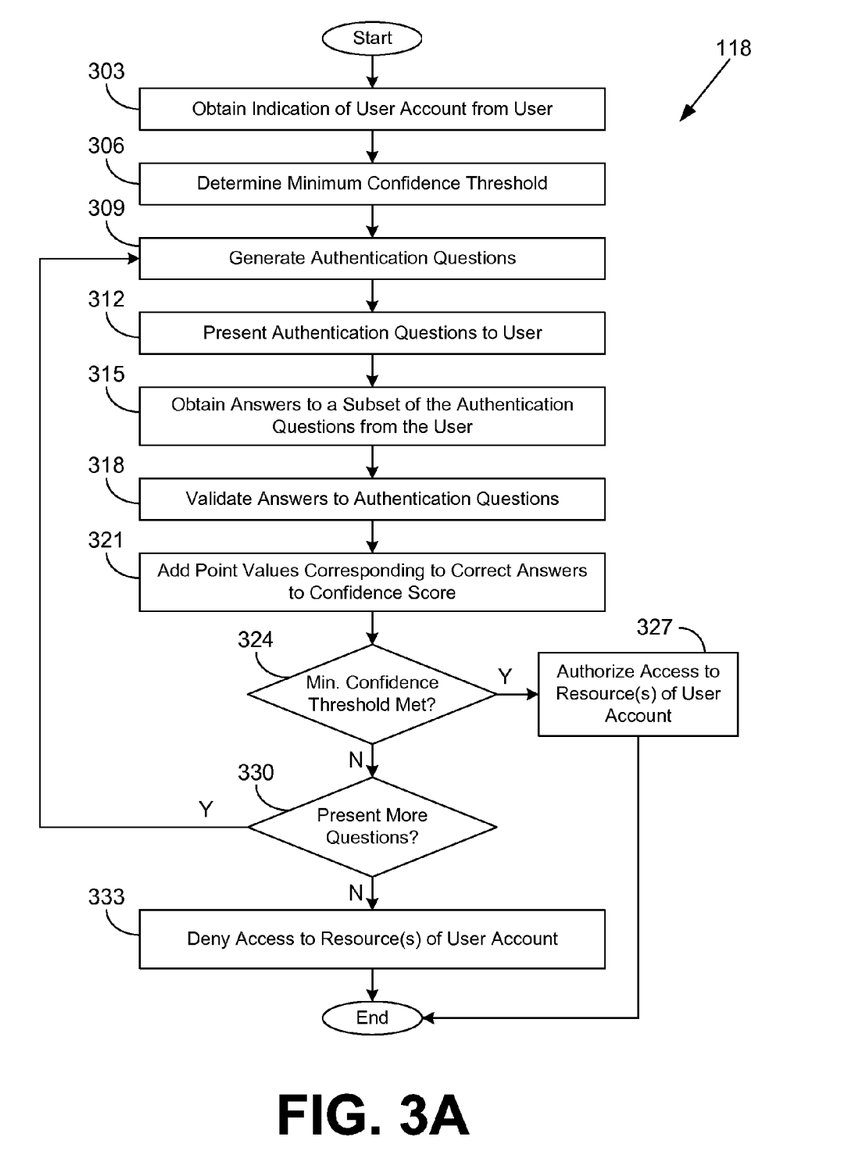
FIGS. 3A-3C are flowcharts illustrating examples of functionality implemented as portions of an authentication application executed in a computing device in the networked environment of FIG. 1 according to various embodiments of the present disclosure.

Referring next to FIG. 3A, shown is a flowchart that provides one example of the operation of a portion of the authentication application 118 according to one embodiment. It is understood that the flowchart of FIG. 3A provides merely an example of the many different types of functional arrangements that may be employed to implement the operation of the portion of the authentication application 118 as described herein. As an alternative, the flowchart of FIG. 3A may be viewed as depicting an example of steps of a method implemented in the computing device 103 (FIG. 1) according to one or more embodiments.

Beginning with box 303, the authentication application 118 obtains an indication of a user account from a user. For example, the user may provide an identifier, a username, an account name, etc. to the authentication application 118 via a network page such as a logon screen. In box 306, the authentication application 118 determines a minimum confidence threshold using the threshold configuration data 148 (FIG. 1). The minimum confidence threshold may depend at least in part on an account type 163 (FIG. 1) associated with the account, the secured resources 166 (FIG. 1) to be accessed by the account, factors relating to account or data longevity 169 (FIG. 1), client characteristics 157 (FIG. 1), and/or other factors.

In box 309, the question generation service 121 (FIG. 1) of the authentication application 118 generates a set of authentication questions 127 (FIG. 1) based at least in part on the question data 145 (FIG. 1) and the stored user account data 142 (FIG. 1). The questions 127 may be associated with differing authentication point values 178 (FIG. 1). In some cases, a question 127 may have multiple choices which are correct, which may also be associated with differing authentication point values 178. The questions 127 may include dummy questions 127 generated based at least in part on the dummy question data 181 (FIG. 1). In box 312, the authentication application 118 presents the authentication questions 127 to the user, e.g., through a network page or other network data sent to the client 109 (FIG. 1) over the network 112 (FIG. 1).

In box 315, the authentication application 118 obtains answers 130 (FIG. 1) to a subset of the authentication questions 127 from the client 109 over the network 112. The user may choose to answer zero or more of the questions 127. In box 318, the authentication application 118 validates the provided answers 130 to the subset of the questions 127 with the answer validation service 124 (FIG. 1). The answers 130 are validated as being correct or incorrect. In box 321, the authentication application 118 adds the authentication point values 178 corresponding to the answers 130 which are correct to the confidence score for the user. The confidence score may be initially set at some predetermined value.

In box 324, the authentication application 118 determines whether the confidence score for the user meets the minimum confidence threshold determined in box 306. If the confidence score does meet the threshold, the user is authenticated and the authentication application 118 proceeds to box 327. In box 327, the authentication application 118 authorizes access to one or more secured resources 166 associated with the user account. Thereafter, the portion of the authentication application 118 ends.

If, by contrast, the confidence score does not meet the threshold, the authentication application 118 instead moves from box 324 to box 330. In box 330, the authentication application 118 determines whether additional questions 127 may be presented to the user in order for the user to attempt to increase his or her confidence score. If additional questions 127 may be presented, the authentication application 118 returns to box 309 and generates additional questions 127. If additional questions 127 are not to be presented, the user is not authenticated, and the authentication application 118 moves from box 330 to box 333. In box 333, the authentication application 118 denies access to the secured resources 166 of the user account. Thereafter, the portion of the authentication application 118 ends.

Figure 3B:
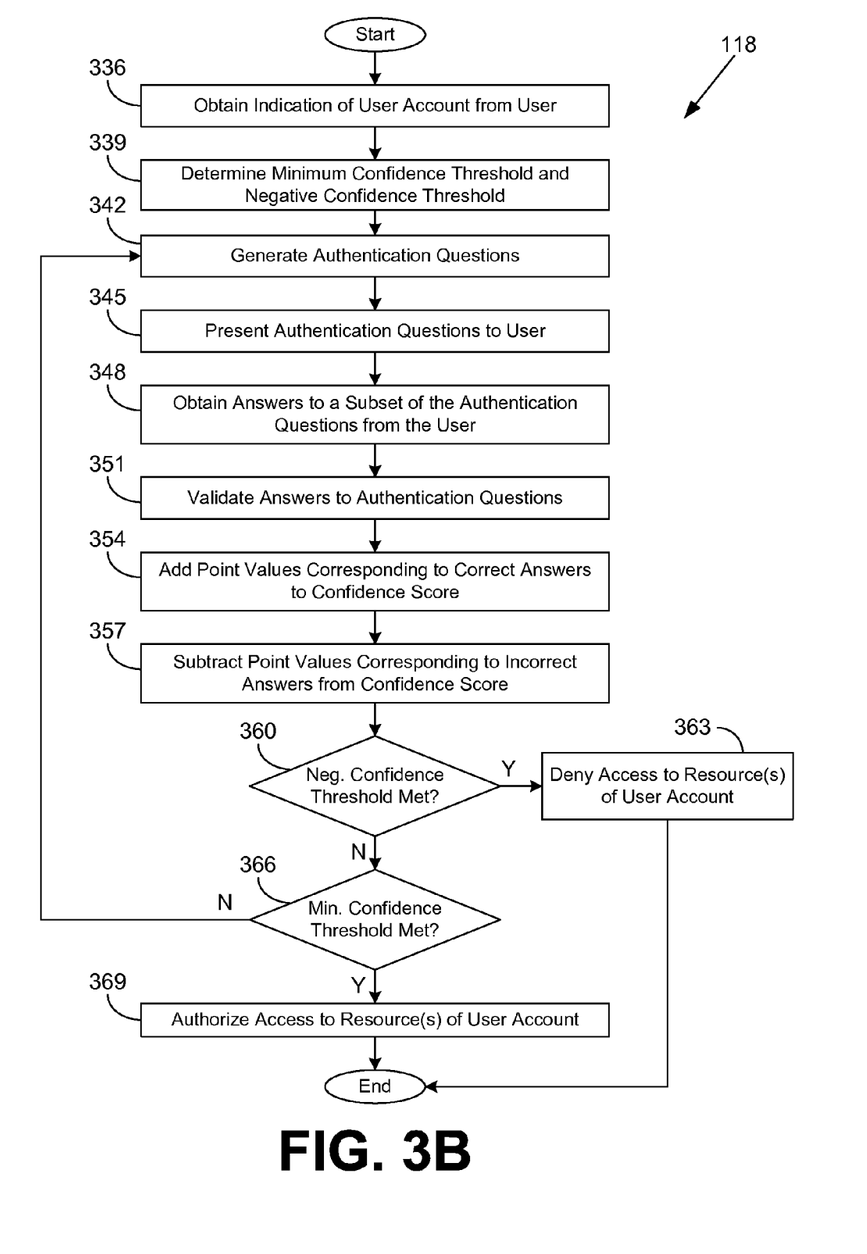

Turning now to FIG. 3B, shown is a flowchart that provides one example of the operation of a portion of the authentication application 118 according to another embodiment. It is understood that the flowchart of FIG. 3B provides merely an example of the many different types of functional arrangements that may be employed to implement the operation of the portion of the authentication application 118 as described herein. As an alternative, the flowchart of FIG. 3B may be viewed as depicting an example of steps of a method implemented in the computing device 103 (FIG. 1) according to one or more embodiments.

Beginning with box 336, the authentication application 118 obtains an indication of a user account from a user. For example, the user may provide an identifier, a username, an account name, etc. to the authentication application 118 via a network page such as a logon screen. In box 339, the authentication application 118 determines a minimum confidence threshold and a negative confidence threshold using the threshold configuration data 148 (FIG. 1). The minimum confidence threshold and the negative confidence threshold may depend at least in part on an account type 163 (FIG. 1) associated with the account, the secured resources 166 (FIG. 1) to be accessed by the account, factors relating to account or data longevity 169 (FIG. 1), client characteristics 157 (FIG. 1), and/or other factors.

In box 342, the question generation service 121 (FIG. 1) of the authentication application 118 generates a set of authentication questions 127 (FIG. 1) based at least in part on the question data 145 (FIG. 1) and the stored user account data 142 (FIG. 1). The questions 127 may be associated with differing authentication point values 178 (FIG. 1). In some cases, a question 127 may have multiple choices which are correct, which may also be associated with differing authentication point values 178. The questions 127 may include dummy questions 127 generated based at least in part on the dummy question data 181 (FIG. 1). In box 345, the authentication application 118 presents the authentication questions 127 to the user, e.g., through a network page or other network data sent to the client 109 (FIG. 1) over the network 112 (FIG. 1).

In box 348, the authentication application 118 obtains answers 130 (FIG. 1) to a subset of the authentication questions 127 from the client 109 over the network 112. The user may choose to answer zero or more of the questions 127. In box 351, the authentication application 118 validates the provided answers 130 to the subset of the questions 127 with the answer validation service 124 (FIG. 1). The answers 130 are validated as being correct or incorrect. In box 354, the authentication application 118 adds the authentication point values 178 corresponding to the answers 130 which are correct to the confidence score for the user. The confidence score may be initially set at some predetermined value. In box 357, the authentication application 118 subtracts the authentication point values 178 corresponding to incorrect answers 130 from the confidence score. It is noted that the subtracted point values may be different from the added point values for responses to a given question 127.

In box 360, the authentication application 118 determines whether the confidence score meets the negative confidence threshold determined in box 339. For example, the confidence score may fall beneath a predetermined value as a result of subtractions in box 357. In some cases, non-answered questions 127 may not affect the confidence score. If the negative confidence threshold is met, the authentication application 118 proceeds to box 363 and denies the user access to any of the secured resources 166 associated with the user account. In other words, the authentication application 118 has confidence that the user is not who he or she is claiming to be. Thereafter, the portion of the authentication application 118 ends.

If, instead, the authentication application 118 determines in box 360 that the negative confidence threshold is not met, the authentication application 118 proceeds from box 360 to box 366. In box 366, the authentication application 118 determines whether the confidence score for the user meets the minimum confidence threshold determined in box 339. If the confidence score does meet the threshold, the user is authenticated and the authentication application 118 proceeds to box 369. In box 369, the authentication application 118 authorizes access to one or more secured resources 166 associated with the user account. Thereafter, the portion of the authentication application 118 ends. If, by contrast, the confidence score does not meet the minimum confidence threshold, the authentication application 118 instead returns to box 342 and generates additional questions 127.

Figure 3C:
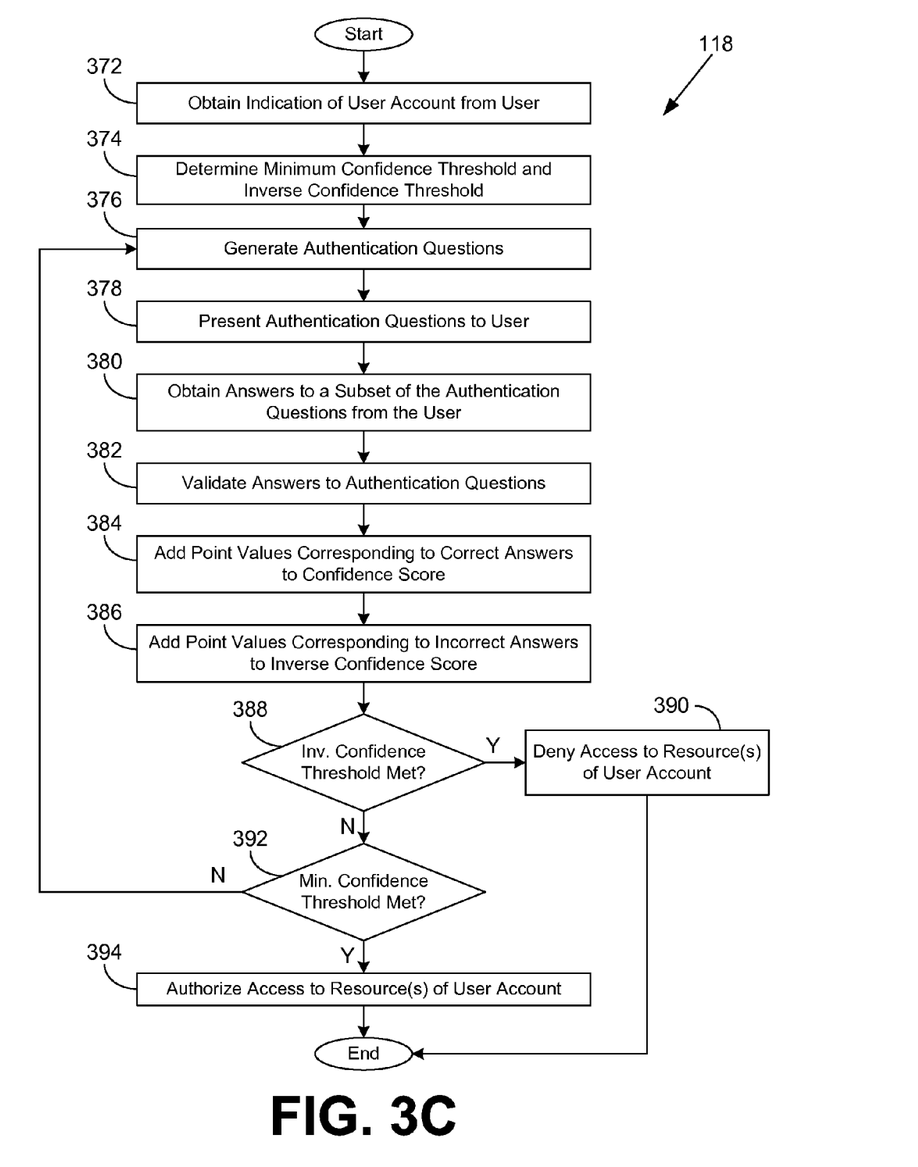

Moving on to FIG. 3C, shown is a flowchart that provides one example of the operation of a portion of the authentication application 118 according to yet another embodiment. It is understood that the flowchart of FIG. 3C provides merely an example of the many different types of functional arrangements that may be employed to implement the operation of the portion of the authentication application 118 as described herein. As an alternative, the flowchart of FIG. 3C may be viewed as depicting an example of steps of a method implemented in the computing device 103 (FIG. 1) according to one or more embodiments.

Beginning with box 372, the authentication application 118 obtains an indication of a user account from a user. For example, the user may provide an identifier, a username, an account name, etc. to the authentication application 118 via a network page such as a logon screen. In box 374, the authentication application 118 determines a minimum confidence threshold and an inverse confidence threshold using the threshold configuration data 148 (FIG. 1). The minimum confidence threshold and the inverse confidence threshold may depend at least in part on an account type 163 (FIG. 1) associated with the account, the secured resources 166 (FIG. 1) to be accessed by the account, factors relating to account or data longevity 169 (FIG. 1), client characteristics 157 (FIG. 1), and/or other factors.

In box 376, the question generation service 121 (FIG. 1) of the authentication application 118 generates a set of authentication questions 127 (FIG. 1) based at least in part on the question data 145 (FIG. 1) and the stored user account data 142 (FIG. 1). The questions 127 may be associated with differing authentication point values 178 (FIG. 1). In some cases, a question 127 may have multiple choices which are correct, which may also be associated with differing authentication point values 178. The questions 127 may include dummy questions 127 generated based at least in part on the dummy question data 181 (FIG. 1). In box 378, the authentication application 118 presents the authentication questions 127 to the user, e.g., through a network page or other network data sent to the client 109 (FIG. 1) over the network 112 (FIG. 1).

In box 380, the authentication application 118 obtains answers 130 (FIG. 1) to a subset of the authentication questions 127 from the client 109 over the network 112. The user may choose to answer zero or more of the questions 127. In box 382, the authentication application 118 validates the provided answers 130 to the subset of the questions 127 with the answer validation service 124 (FIG. 1). The answers 130 are validated as being correct or incorrect. In box 384, the authentication application 118 adds the authentication point values 178 corresponding to the answers 130 which are correct to the confidence score for the user. In box 386, the authentication application 118 adds the authentication point values 178 corresponding to incorrect answers 130 to the inverse confidence score. The confidence score and the inverse confidence score may be initially set at predetermined values. It is noted that the added point values to the inverse confidence score may be different from the added point values to the confidence score for responses to a given question 127.

In box 388, the authentication application 118 determines whether the confidence score meets the inverse confidence threshold determined in box 374. In some cases, non-answered questions 127 may not affect the inverse confidence score. If the inverse confidence threshold is met, the authentication application 118 proceeds to box 390 and denies the user access to any of the secured resources 166 associated with the user account. In other words, the authentication application 118 has confidence that the user is not who he or she is claiming to be. Thereafter, the portion of the authentication application 118 ends.

If, instead, the authentication application 118 determines in box 388 that the inverse confidence threshold is not met, the authentication application 118 proceeds from box 388 to box 392. In box 392, the authentication application 118 determines whether the confidence score for the user meets the minimum confidence threshold determined in box 374. If the confidence score does meet the threshold, the user is authenticated and the authentication application 118 proceeds to box 394. In box 394, the authentication application 118 authorizes access to one or more secured resources 166 associated with the user account. Thereafter, the portion of the authentication application 118 ends. If, by contrast, the confidence score does not meet the minimum confidence threshold, the authentication application 118 instead returns to box 376 and generates additional questions 127.

Figure 4:
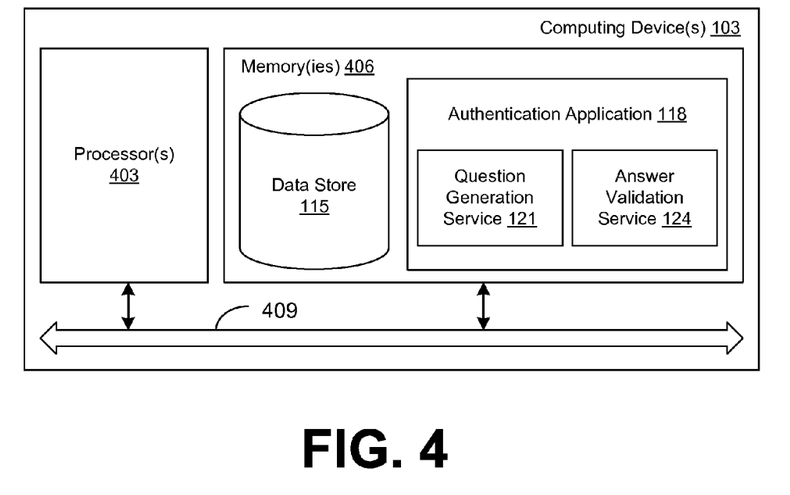
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the authentication application 118, the question generation service 121, the answer validation service 124, and potentially other applications. Also stored in the memory 406 may be a data store 115 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the authentication application 118, the question generation service 121, the answer validation service 124, the authentication client application 184 (FIG. 1), the external validation provider 139 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A-3C show the functionality and operation of an implementation of portions of the authentication application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A-3C show a specific order of execution, it is understood that the order of execution may differ from that which is depicted. For example, the order of execution of two or more blocks may be scrambled relative to the order shown. Also, two or more blocks shown in succession in FIGS. 3A-3C may be executed concurrently or with partial concurrence. Further, in some embodiments, one or more of the blocks shown in FIGS. 3A-3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication application 118, the question generation service 121, the answer validation service 124, the authentication client application 184, and the external validation provider 139, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable by a computing device, the program comprising:
   code that obtains an identification of a user account from a user at a client, the user account being associated with one of a plurality of account types;
   code that determines a minimum confidence threshold and a minimum inverse confidence threshold based at least in part on the one of the plurality of account types;
   code that presents a plurality of authentication questions to the user, the plurality of authentication questions being determined based at least in part on order history information associated with the user account and a characteristic associated with the client;
   code that obtains a corresponding answer to each of a subset of the plurality of authentication questions from the user, each of the answers being associated with a respective authentication point value;
   code that generates a confidence score for the user, wherein the confidence score is increased by the respective authentication point values of the answers that are correct;
   code that generates an inverse confidence score for the user, wherein the inverse confidence score is increased by the respective authentication point values of the answers that are incorrect;
   code that determines whether the confidence score meets the minimum confidence threshold and whether the inverse confidence score meets the minimum inverse confidence threshold;
   code that authorizes access by the client to a resource associated with the user account in response to determining that the confidence score meets the minimum confidence threshold and the inverse confidence score does not meet the minimum inverse confidence threshold;
   code that presents at least one additional authentication question to the user in response to determining that the confidence score does not meet the minimum confidence threshold and the inverse confidence score does not meet the minimum inverse confidence threshold; and
   code that disables access by the client to any resource associated with the user account in response to determining that the inverse confidence score meets the minimum inverse confidence threshold.

2. A system, comprising:
   at least one computing device; and
   an authentication application executable in the at least one computing device, the authentication application comprising:
      logic that obtains an identification of a user account from a user;
      logic that determines a minimum confidence threshold;
      logic that presents a plurality of authentication questions to the user, the plurality of authentication questions being determined based at least in part on stored transaction information associated with the user account;
      logic that obtains a corresponding answer to each of a subset of the plurality of authentication questions from the user, each of the answers being associated with a respective authentication point value, at least two of the answers being associated with different respective authentication point values;
      logic that generates a confidence score for the user, wherein the confidence score is increased by the respective authentication point values of the answers that are correct; and
      logic that authorizes access by the user to a resource associated with the user account in response to determining that the confidence score meets the minimum confidence threshold.

3. The system of claim 2, wherein the authentication application further comprises logic that determines a characteristic associated with a client in use by the user, wherein the authentication application is in data communication with the client.

4. The system of claim 3, wherein the plurality of authentication questions are determined based at least in part on the characteristic.

5. The system of claim 3, wherein the minimum confidence threshold is determined based at least in part on the characteristic.

6. The system of claim 3, wherein the characteristic is determined based at least in part on data selected from the group consisting of: a cookie, a set of location coordinates, and an internet protocol (IP) address.

7. The system of claim 2, wherein the authentication application further comprises logic that presents at least one other authentication question to the user in response to determining that the confidence score is below the minimum confidence threshold and above a negative confidence threshold.

8. The system of claim 2, wherein the authentication application further comprises:
logic that determines a negative confidence threshold;
logic that denies access by the user to any resource associated with the user account in response to determining that the confidence score falls beneath the negative confidence threshold; and
wherein the confidence score is decreased by the respective authentication point values of the answers that are incorrect.

9. The system of claim 2, wherein at least one of the plurality of authentication questions has at least two possible correct answers, at least some of the possible correct answers being associated with different authentication point values.

10. The system of claim 2, wherein at least one of the plurality of authentication questions corresponds to a dummy question, and the logic that generates the confidence score is further configured to decrease the confidence score by the respective authentication point value associated with the answer to the dummy question in response to determining that the dummy question is answered by the user.

11. The system of claim 2, wherein at least one of the plurality of authentication questions elicits a payment instrument capable of external validation.

12. The system of claim 2, wherein the user account is associated with one of a plurality of account types, and each of the plurality of account types is associated with a different minimum confidence threshold.

13. The system of claim 2, wherein the minimum confidence threshold is determined based at least in part on the resource, the resource corresponds to a first one of a plurality of resources associated with the user account, and a second one of the plurality of resources is associated with a different minimum confidence threshold.

14. A method, comprising:
obtaining, by at least one computing device, an identification of a user account from a user;
determining, by the at least one computing device, a minimum confidence threshold and a minimum inverse confidence threshold;
presenting, by the at least one computing device, a plurality of authentication questions to the user, the plurality of authentication questions being determined based at least in part on stored transaction information associated with the user account;
obtaining, by the at least one computing device, a corresponding answer to each of a subset of the plurality of authentication questions from the user, each of the answers being associated with a respective authentication point value;
generating, by the at least one computing device, a confidence score for the user, wherein the confidence score is increased by the respective authentication point values of the answers that are correct;
generating, by the at least one computing device, an inverse confidence score for the user, wherein the inverse confidence score is increased by the respective authentication point values of the answers that are incorrect; and
authorizing, by the at least one computing device, access by the user to a resource associated with the user account in response to determining that the confidence score meets the minimum confidence threshold and the inverse confidence score does not meet the minimum inverse confidence threshold.

15. The method of claim 14, further comprising denying, by the at least one computing device, access by the user to any resource associated with the user account in response to determining that the inverse confidence score meets the minimum inverse confidence threshold.

16. The method of claim 14, wherein the resource corresponds to a tangible resource, and access by the user corresponds to physical access by the user.

17. The method of claim 14, wherein at least one of the plurality of authentication questions is preselected by the user, and at least one of the plurality of authentication questions is not preselected by the user.

18. The method of claim 14, wherein at least one of the plurality of authentication questions relates to a previous order by the user through an electronic commerce system.

19. The method of claim 14, wherein the minimum confidence threshold is determined based in part on a longevity associated with the user account.

20. The method of claim 14, wherein the minimum confidence threshold is determined based in part on a location of the user.

21. The method of claim 14, wherein the minimum confidence threshold is determined based in part on whether the resource corresponds to a security credential reset for the user account.

* * * * *